US 8,654,344 B2

(12) United States Patent
Borot et al.

(10) Patent No.: US 8,654,344 B2
(45) Date of Patent: Feb. 18, 2014

(54) DEVICE FOR GENERATING A SECONDARY SOURCE BY LASER-MATERIAL INTERACTION COMPRISING AN OPTICAL DEVICE FOR CONTROLLING THE ORIENTATION AND THE POSITION OF A SURFACE IN MOVEMENT

(75) Inventors: Antonin Borot, Cachan (FR); Rodrigo Lopez-Martens, Paris (FR); Jean-Paul Geindre, Saint Gratien (FR); Denis Douillet, Palaiseau (FR)

(73) Assignees: Ecole Polytechnique, Palaiseau Cedex (FR); Ecole Nationale Superieure de Techniques Avancees, Paris (FR)

( * ) Notice: Subject to any disclaimer, the term of this patent is extended or adjusted under 35 U.S.C. 154(b) by 0 days.

(21) Appl. No.: 13/350,700

(22) Filed: Jan. 13, 2012

(65) Prior Publication Data

US 2012/0126148 A1 May 24, 2012

Related U.S. Application Data

(63) Continuation of application No. 13/132,591, filed as application No. PCT/EP2009/066397 on Dec. 4, 2009, now abandoned.

(30) Foreign Application Priority Data

Dec. 4, 2008 (FR) ..................................... 08 58270

(51) Int. Cl.
*G01B 11/02* (2006.01)
(52) U.S. Cl.
USPC ....................................... 356/498; 250/504 R
(58) Field of Classification Search
USPC ..................... 356/450–521; 250/503.1, 504 R
See application file for complete search history.

(56) References Cited

U.S. PATENT DOCUMENTS

| 5,790,253 A * | 8/1998 | Kamiya ......................... 356/500 |
| 6,124,601 A * | 9/2000 | Yoshii et al. .............. 250/559.29 |
| 6,741,358 B1 * | 5/2004 | Kamiya ......................... 356/500 |
| 2004/0195529 A1 | 10/2004 | Hergenhan et al. |

(Continued)

FOREIGN PATENT DOCUMENTS

JP          2007-103176 A       4/2007

OTHER PUBLICATIONS

K. Nishihara, "The Punch-Out Target", EUVL05 Source Workshop, www.sematech.org/meetings/archives/litho/7739/index.htm, pp. 2 and 6, Feb. 18, 2010, XP002569228.

(Continued)

*Primary Examiner* — Tarifur Chowdhury
*Assistant Examiner* — Michael P Lapage
(74) *Attorney, Agent, or Firm* — Baker & Hostetler LLP

(57) ABSTRACT

A device for generating a secondary source from a primary optical source emitting a first optical beam focused onto a surface in movement, with which said first beam interacts so as to generate a secondary beam, includes an optical device for controlling the orientation and position of said surface to determine the orientation and position of the emission point of said secondary source on said surface. The device comprises: a control laser beam split into two branches, a fixed reference beam and a mobile analysis beam reflected by the surface in movement; means for making said reference and analysis beams interfere to generate interference fringes; means for imaging the interference fringes carrying information about the orientation and position of said surface; means for analyzing said interference images; and means for generating a feedback loop for controlling the orientation and position of said surface in movement based on the analysis.

15 Claims, 6 Drawing Sheets

(56) References Cited

U.S. PATENT DOCUMENTS

2005/0037288 A1* 2/2005 Chen .............................. 430/311
2005/0068540 A1* 3/2005 De Groot et al. .............. 356/512
2007/0154143 A1* 7/2007 Mihailov et al. ................ 385/37
2008/0157011 A1 7/2008 Nagai et al.

OTHER PUBLICATIONS

Oh et al., "Measuring and Compensating for 5-D0F Parasitic Motion Errors in Translation Stages Using Twyman-Green Interferometry", International Journal of Machine Tool Design and Research, Nov. 1, 2006, pp. 1748-1752, vol. 46, No. 14, Pergamon Press, Oxford, GB, XP005595046.

A. Sagisaka, et al., "Simultaneous Generation of UV Harmonics and Protons From a Thin-Foil Target with a High-Intensity Laser", IEEE Transaction on Plasma Science, Aug. 1, 2008, pp. 1812-1816, vol. 36, No. 4, IEEE Service Center, Piscataway, NJ, US, XP011232792.

PCT International Search Report cited in International Application No. PCT/EP2009/066397 mailed Apr. 12, 2010.

* cited by examiner

DEVICE FOR GENERATING A SECONDARY SOURCE BY LASER-MATERIAL INTERACTION COMPRISING AN OPTICAL DEVICE FOR CONTROLLING THE ORIENTATION AND THE POSITION OF A SURFACE IN MOVEMENT

CROSS-REFERENCE TO RELATED APPLICATIONS

This application is a continuation of U.S. patent application Ser. No. 13/132,591, filed on Jun. 2, 2011, which is a National Stage of International patent application PCT/EP2009/066397, filed on Dec. 4, 2009, which claims priority to foreign French patent application No. FR 0858270, filed on Dec. 4, 2008, the disclosures of which are incorporated by reference in their entireties.

FIELD OF THE INVENTION

The field of the invention is that of devices for controlling the orientation and the position of a surface in movement and, in particular, a surface intended to be used as a target for a primary laser beam in order to generate a secondary beam (X-UV, electrons, protons, etc.) by interaction with said target.

BACKGROUND

This type of device is employed notably in the field of generating high-order harmonics by laser-material interaction on a solid target, corresponding to the generation of an electromagnetic field of extremely short wavelength, of the order of a few tens of nanometers; these harmonics can be set in phase in order to generate pulses of attosecond length (in practice of the order of $10^{-17}$ or $10^{-16}$ second). Such radiation sources are desirable, for example, in the analysis of ultrafast phenomena on the subatomic scale.

There are currently harmonic sources obtained from the interaction of a femtosecond laser on a solid target, although these are produced with a low or very low repetition rate (<10 Hz). This is possible because the phenomenon of laser-material interaction generates a secondary beam which may typically be a harmonic beam, that is to say a light beam with a wavelength shorter than that of the primary source.

The problem encountered with this type of interaction of an ultra-intense laser on a solid target, when wishing to operate at a very high rate, is to be able to regenerate the interaction surface between each shot because each interaction leads to destruction of the interaction surface, and it is necessary for the light pulse of the primary source to interact with a fresh region on the target.

It is therefore necessary to provide means for displacing the target between each shot, so that the surface presented to the subsequent laser pulse is intact. Given that the focal point of the laser is fixed in space, one solution consists in using a disk-shaped target to which a rotational movement is imparted, so that the impacts of the laser on the target form a circle. Once the circle is completed, the target is translated parallel to the surface of the target then the rotational movement is restarted in order to obtain a circle concentric with the first, and so on. This method makes it possible to obtain a secondary source whose repetition rate is equal to that of the primary source.

Nevertheless, and this is inherent to the method employed, setting the target in movement creates instabilities in the emission of the secondary source, both in terms of the position of said secondary source (which also leads to an instability in the efficiency of the generation process) and in terms of the orientation of said source, while it is necessary to be able to provide a secondary source with high precision in terms of beam position and orientation.

SUMMARY OF THE INVENTION

In order to resolve the aforementioned problems, the present invention provides a device for generating a secondary source from a primary optical source emitting a first optical beam at a first wavelength $\lambda_1$ focused onto a surface in movement, with which said first beam interacts so as to generate a secondary beam, characterized in that it furthermore comprises an optical device for controlling the orientation and the position of said surface in movement so as to determine the orientation and the position of the emission point of said secondary source on said surface, said optical device for controlling the orientation and the position of a surface in movement by interferometric measurement comprising:
  a control laser beam split into two branches, one of which is a fixed reference beam and the other of which is a mobile analysis beam reflected by the surface in movement;
  means for making said reference and analysis beams interfere so as to generate interference fringes;
  means of the camera type for imaging the interference fringes carrying information about the orientation and position of said surface;
  means for analyzing said interference images;
  means for generating a feedback loop for controlling the orientation and the position of said surface in movement based on the analysis of said signal carrying information.

According to a variant of the invention, the means for analyzing said interference images comprise means for temporal analysis of the following parameters:

According to a variant of the invention, the means for generating a feedback loop comprise a set of motorized actuators coupled to said surface in movement and arranged in "line-point-plane" fashion, in a plane substantially parallel to that of the surface in movement in order to adjust the orientation and the position of said surface.

According to a variant of the invention, the device comprises a helium-neon laser generating the frequency-stabilized control laser beam.

According to a variant of the invention, the surface in movement is a glass or metal or plastic disk.

According to a variant of the invention, the means for making said reference and analysis beams interfere so as to generate an interference beam comprise two beam splitters and a return mirror.

According to a variant of the invention, the device furthermore comprises means for widening the diameter of said laser beam, which are placed upstream of the splitting of the analysis beam, so as to cover the detection surface of the camera.

According to a variant of the invention, the analysis means comprise image processing means for extracting the information about the variation in position and orientation of said surface with respect to a reference plane.

According to a variant of the invention, the beam of the secondary source is of the X-UV, electron or proton type.

According to a variant of the invention, the surface in movement is mounted on a target holder, said target holder being equipped with means for setting said surface in rotation and means for translation of said surface.

According to a variant of the invention, the target holder and the surface in movement are mounted in a vacuum chamber.

According to a variant of the invention, the control laser beam is generated by a continuous-wave laser source having a wavelength less than or equal to the wavelength of the primary optical source, in order to ensure high measurement precision.

According to a variant of the invention, the primary optical source is a femtosecond pulse laser source.

According to a variant of the invention, the secondary source is a laser beam, which is a harmonic of the primary source, with a duration of from a few tens to a few hundreds of attoseconds.

BRIEF DESCRIPTION OF THE DRAWINGS

The invention will be better understood, and other advantages will become apparent, on reading the following description given nonlimitingly and with the aid of the appended figures, in which:

the variation in the spacing of the fringe pattern, corresponding to the number of interference fringes imaged on the camera;

the offset of the fringe pattern in terms of position of the interference fringe pattern with respect to the edge of the camera;

the inclination of the interference fringes, corresponding to the angle of the fringes with respect to the vertical axis of the camera defined in a plane substantially parallel to that of the surface in movement.

Figure 1:
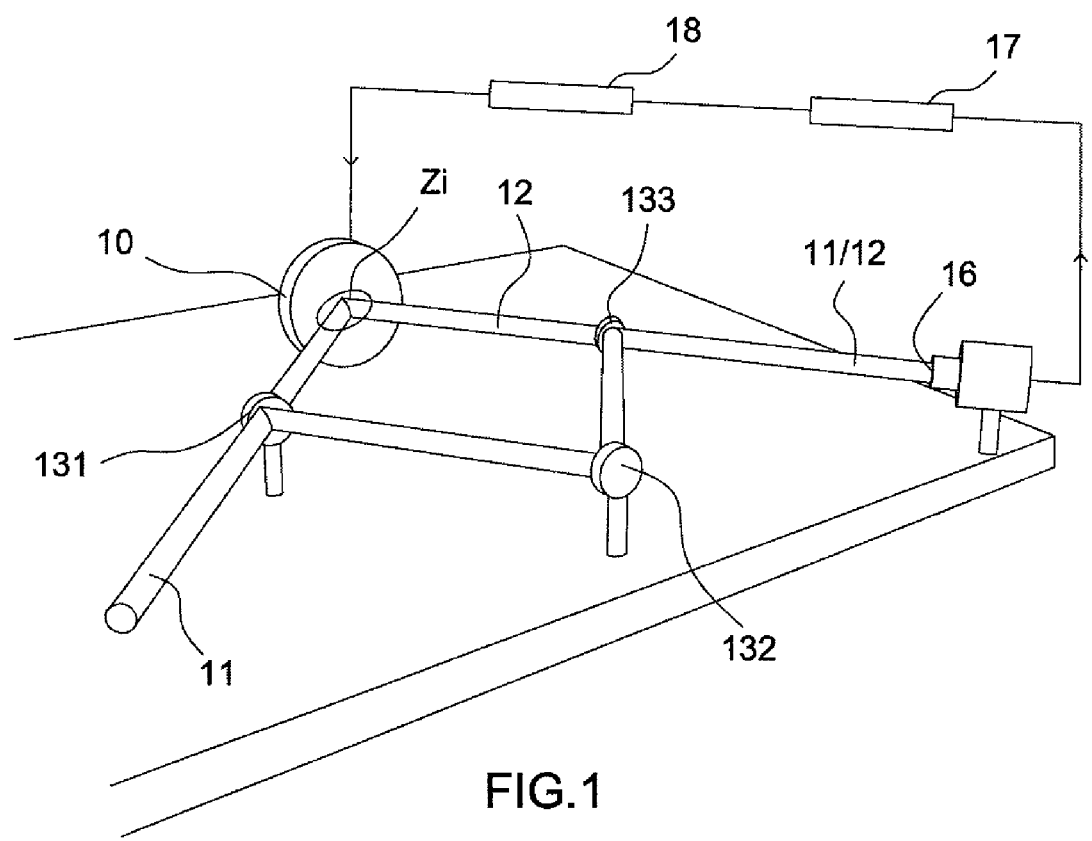
Figure 2A:
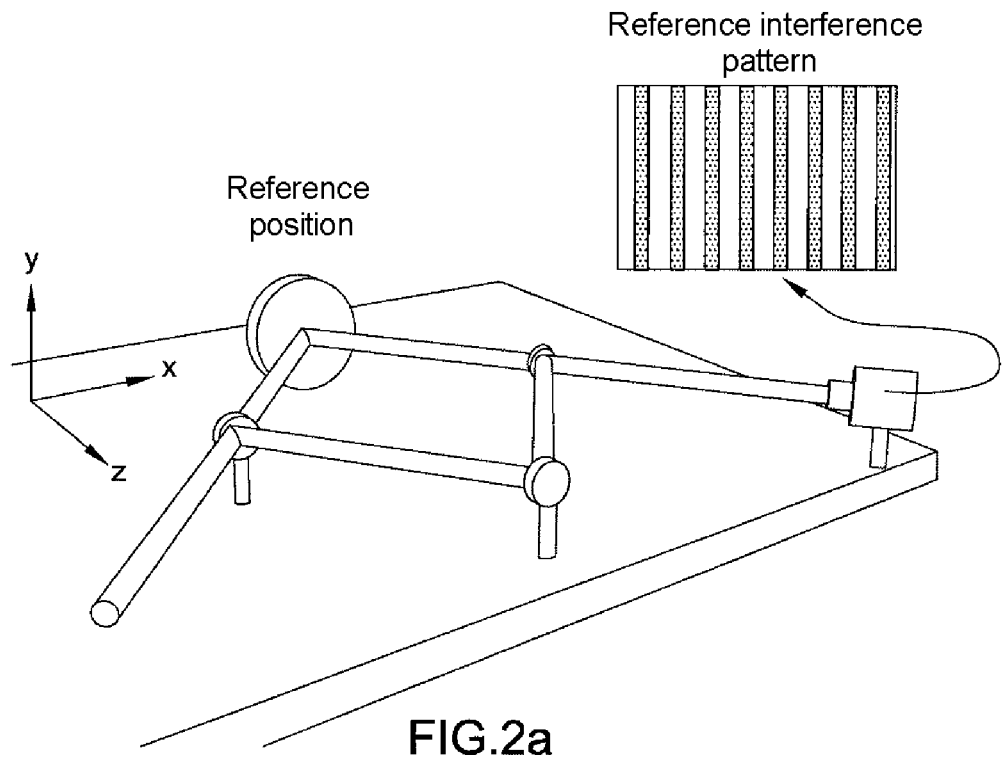
Figure 2B:
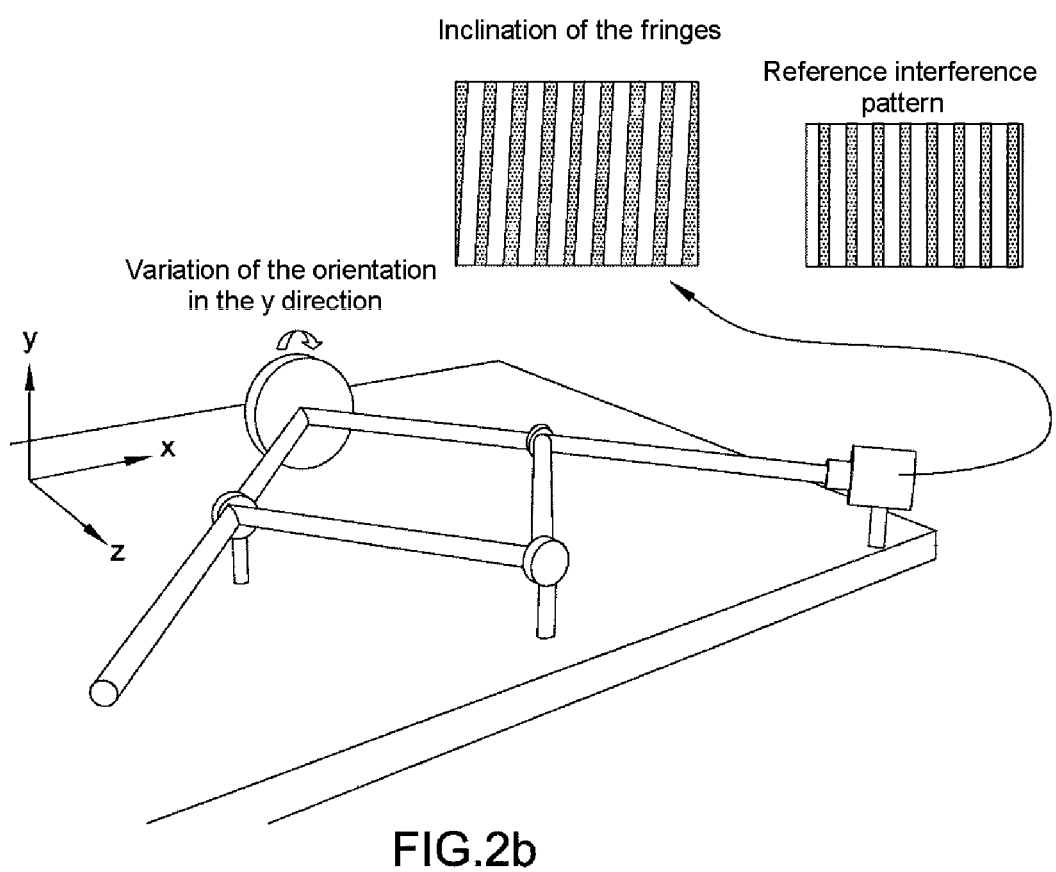
Figure 2C:
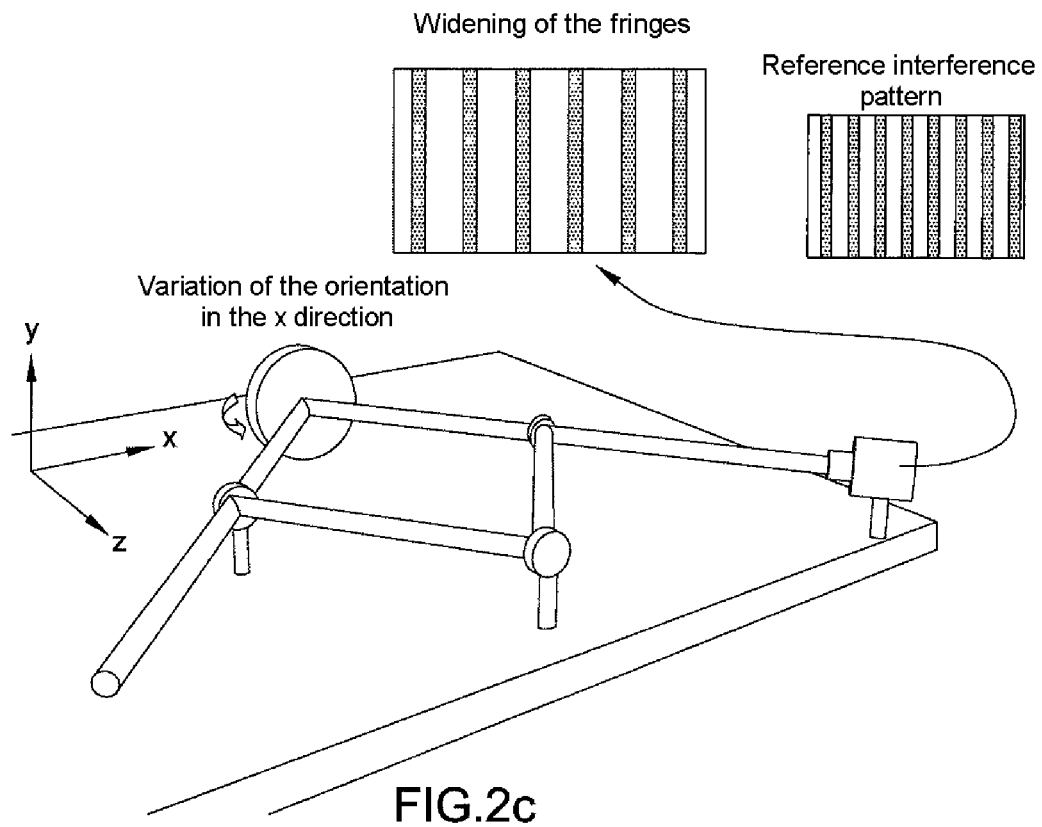
Figure 2D:
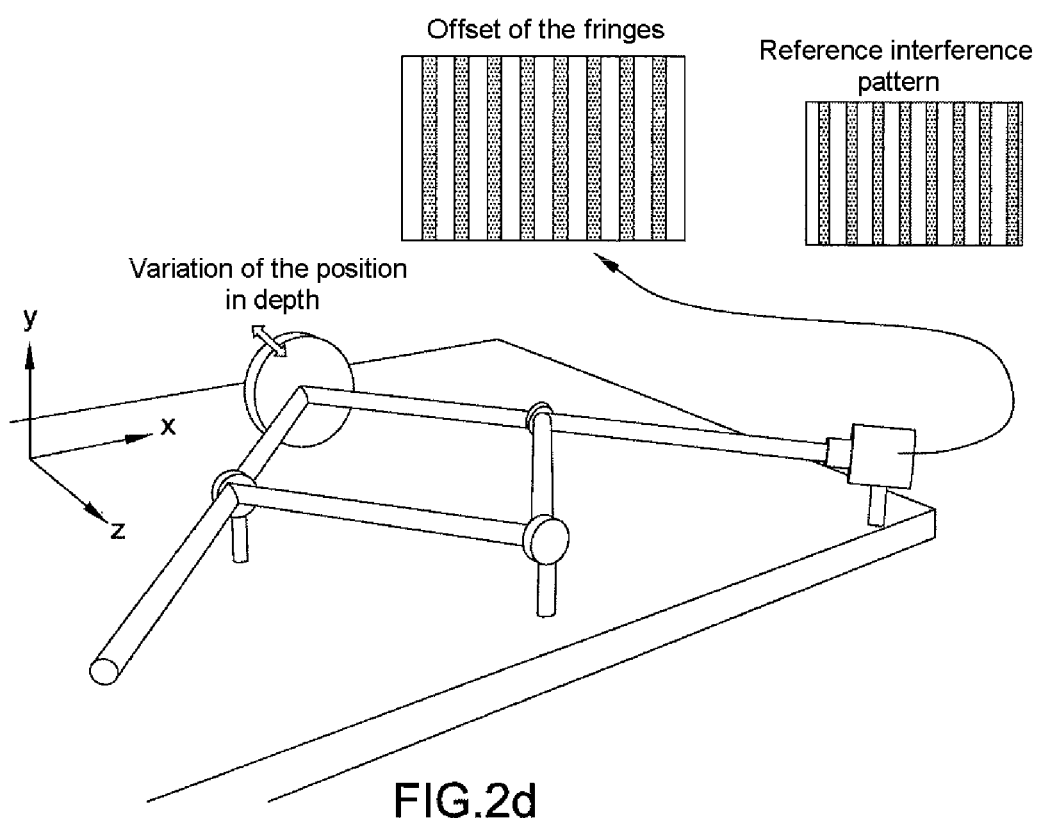
Figure 3A:
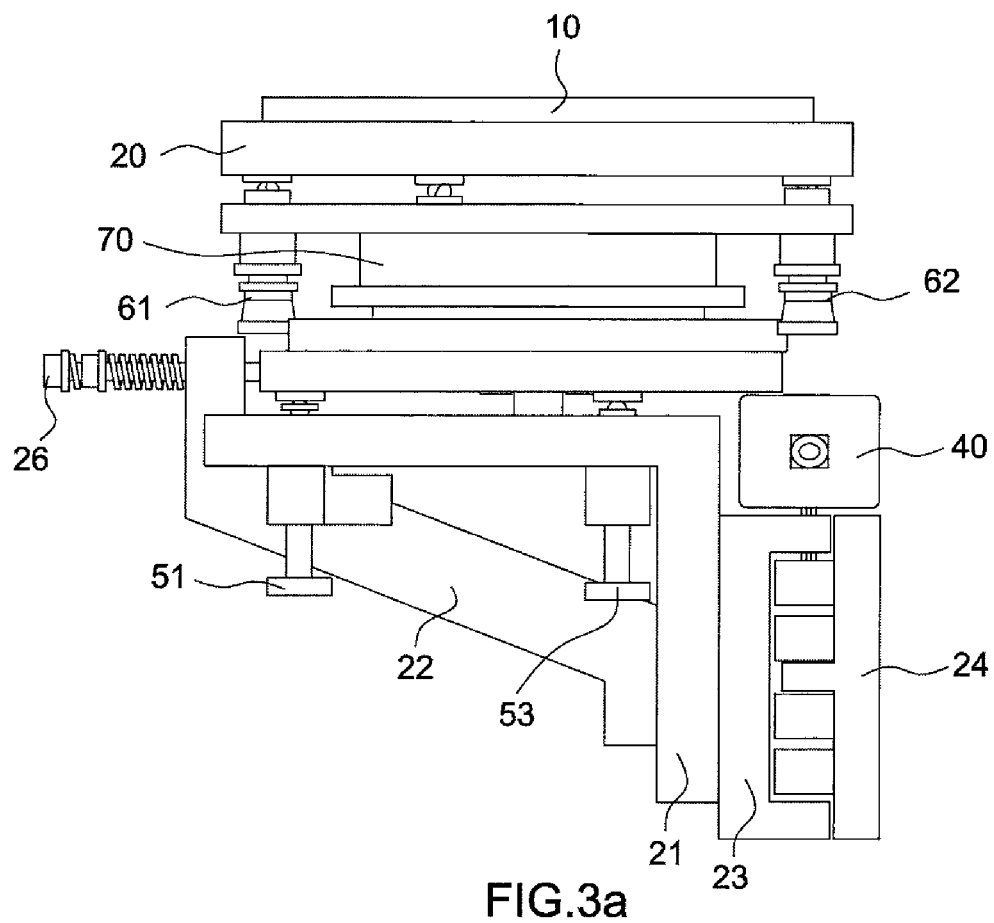
Figure 3B:
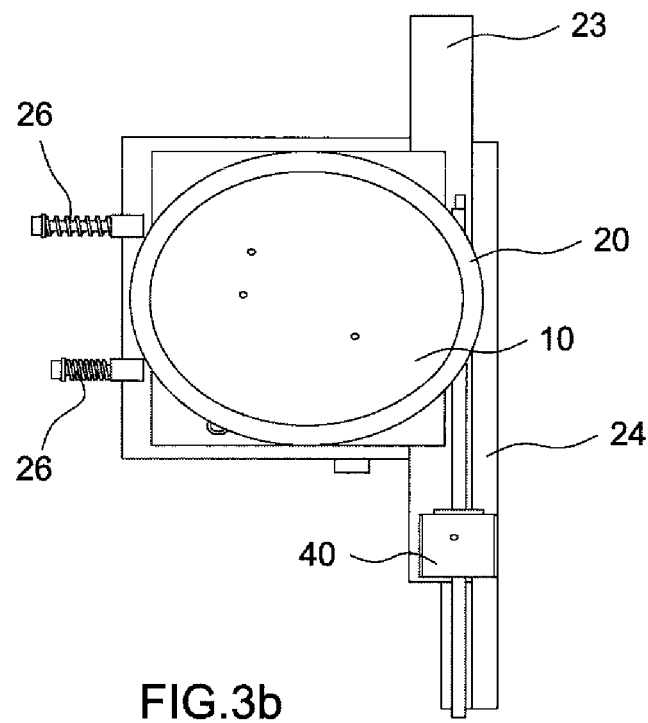
Figure 3C:
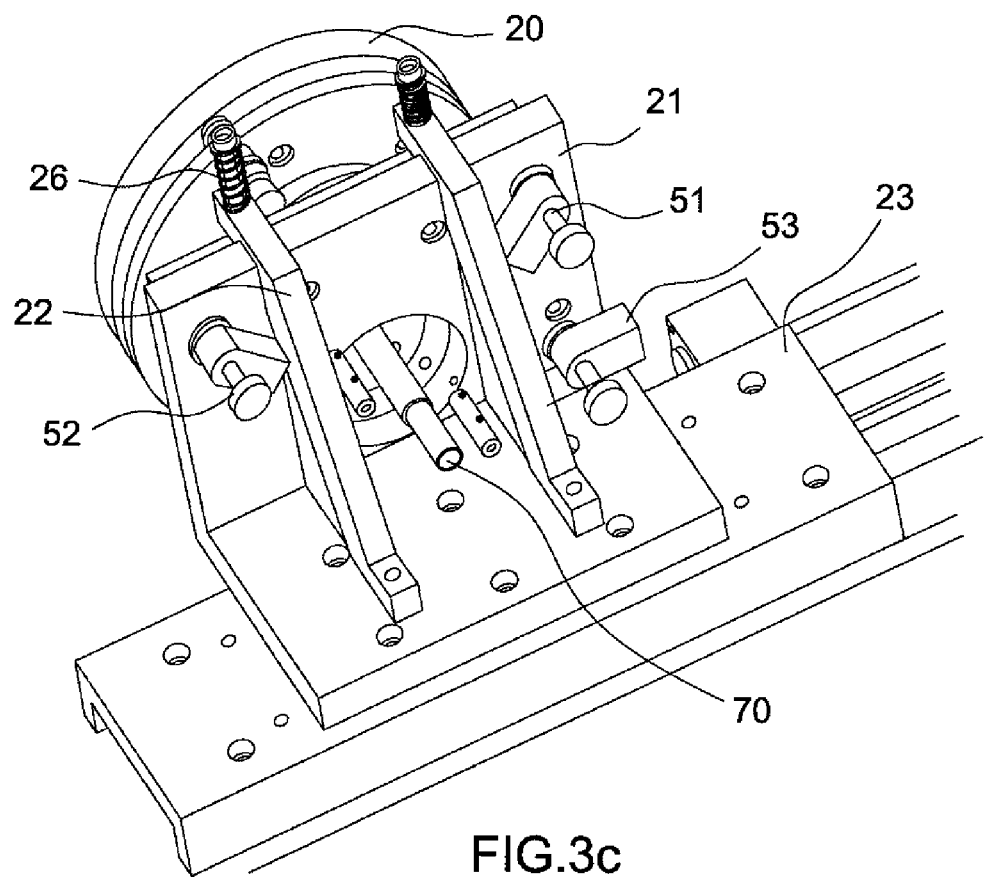
Figure 4A:
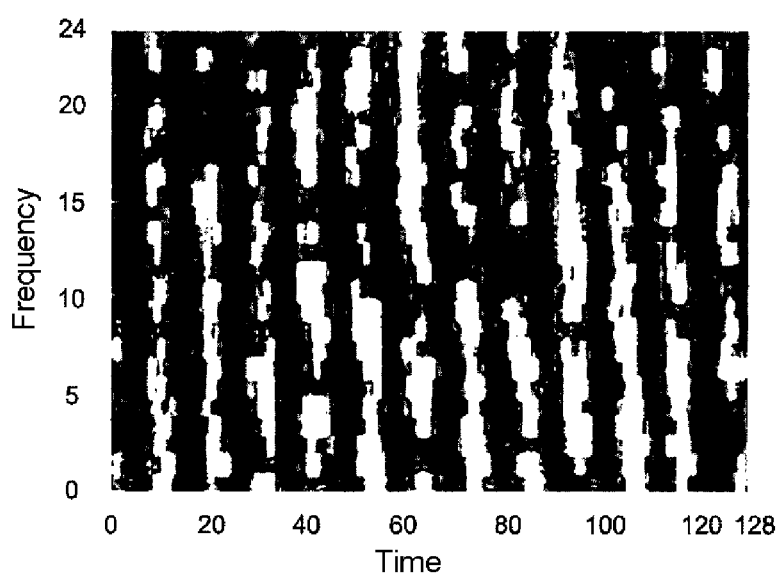
Figure 4B:
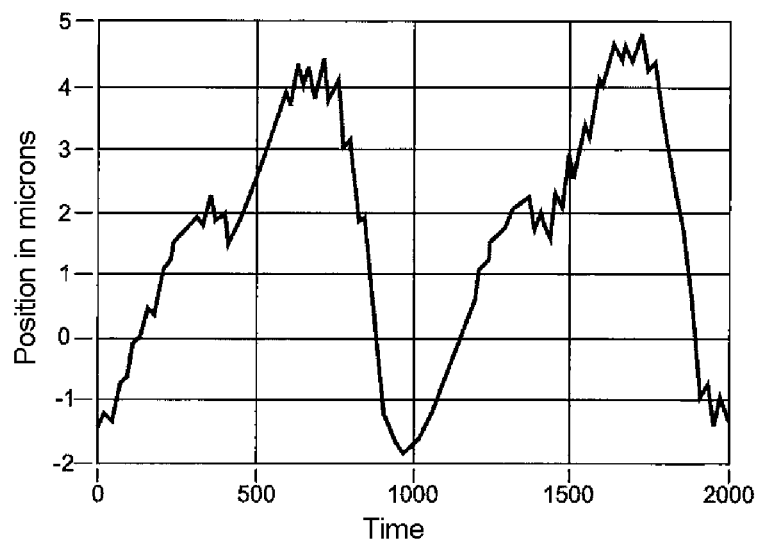
Figure 5:
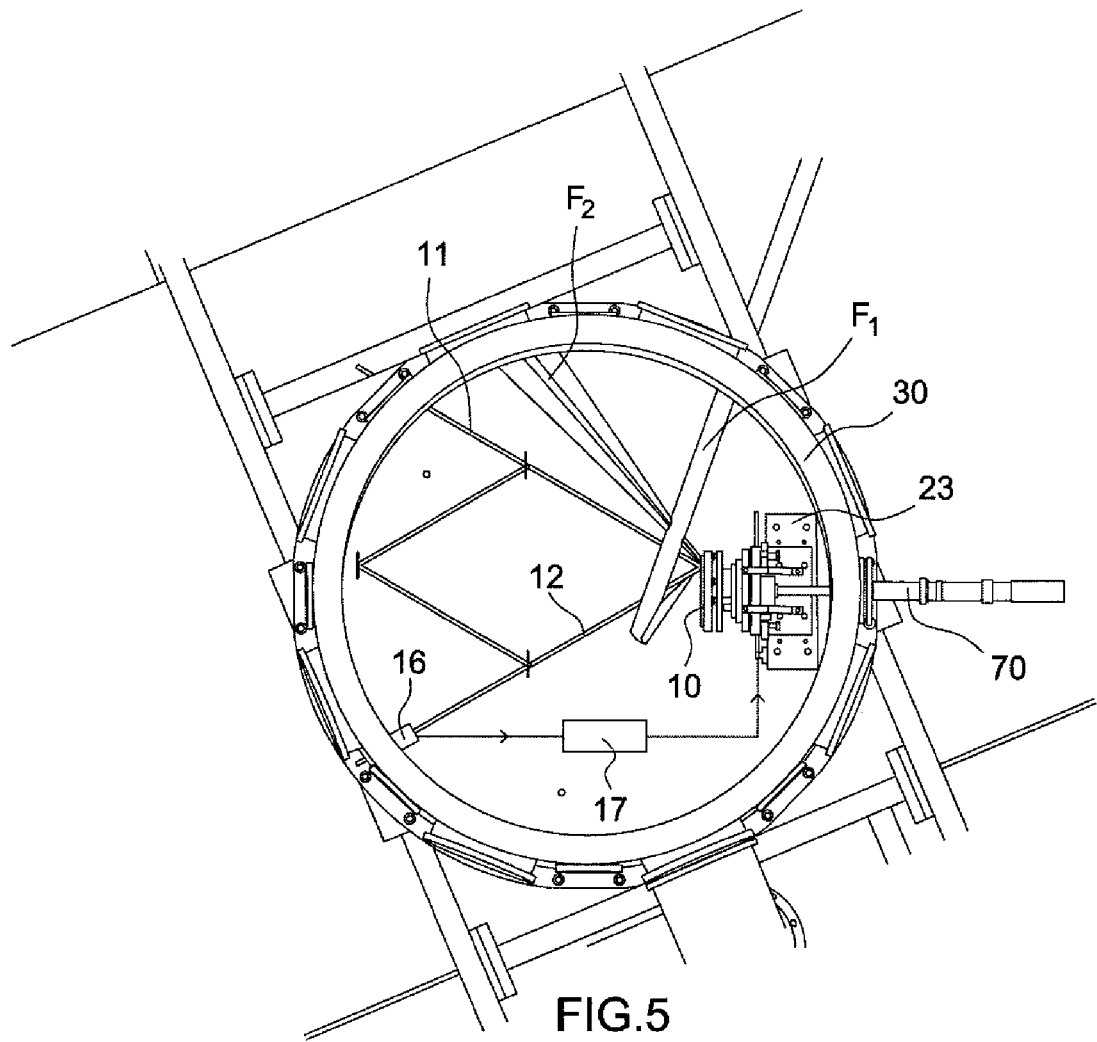

FIG. 1 schematizes the device for controlling the orientation and the position of a surface in movement, which is used in a device according to the invention;

FIGS. 2a, 2b, 2c and 2d illustrate the various positions which can be adopted by the surface in movement and their effects on the interference fringes;

FIGS. 3a, 3b and 3c illustrate various views of an example of a target holder on which the target, intended to generate a secondary source by interaction of a primary optical source and the material, is mounted;

FIGS. 4a and 4b respectively illustrate interference fringes visible on the camera and position information (in micrometers) collected in said camera from these fringes in the device of the invention;

FIG. 5 illustrates an example of a secondary source device comprising a control device according to the invention, the secondary source represented being the harmonic beam generated by the interaction.

DETAILED DESCRIPTION

The control device proposed to be used in the present invention is illustrated schematically in FIG. 1.

A target 10 is illuminated by a control laser beam 11 in an impact zone Zi.

This laser beam may advantageously be a laser of the frequency-stabilized helium-neon type having a long coherence length. This illumination generates a reflected analysis optical beam 12.

Two beam splitters and a fixed mirror are sufficient to assemble an interferometer of the Mach-Zehnder type. The beam is first split into two branches by means of a first splitter 131; a first branch is directed toward a fixed mirror 132 and a second branch is directed to the target. They are subsequently recombined with the aid of a second beam splitter 133, and sent onto the camera where they interfere and generate a beam 11/12 producing interference fringes which the device of the invention is intended to analyze.

The movement of the target leads to a displacement of the branch of the laser reflected from the target, with respect to the fixed branch, which leads to a movement of the interference fringes. It is desirable to enlarge the diameter of the beam before the first splitter in order to cover the detection surface of the camera. A frequency-stabilized helium-neon laser may be used in order to avoid the frequency drift of a conventional helium-neon laser, and thus improve the resolution of the device.

Means are provided for enlarging the diameter of said beam before the first splitter, in order to cover the detection surface of the camera.

The two branches are subsequently recombined and imaged on a camera 16. This camera captures the interference fringes.

The image processing means 17 at the output of the camera deliver the angle and position variations of the surface in movement in real time, and thus make it possible to correct the movements of the surface by using the means 18.

When the surface is moved in rotation about an axis substantially perpendicular to its surface, the drive structures and the alignment defects can lead to the generation of orientation and position differences with respect to an ideal fixed interaction surface. It is these differences which make it possible to compensate the device of the invention, by measuring them and providing a slaving loop for correcting them by acting on said mobile surface.

FIGS. 2a, 2b, 2c and 2d relate respectively to a standard reference position of the surface defined in a coordinate system (X, Y, Z), to a rotation of said surface in the y direction, to a rotation of said surface in the x direction and to a variation in depth, and in each of the aforementioned cases they show the change in the interference fringes detected on the camera, as will be explained below in the rest of the description.

With the aid of precision motors mounted on the surface in movement, a feedback loop makes it possible to compensate in real time for the angle and position variations of the surface, and to offer at any time a surface in movement which always has the same position and the same orientation. These motors are advantageously very small motors of the picomotor type.

Example of a Position Control Device Used in a Device According to the Invention:

FIGS. 3a, 3b and 3c illustrate in this regard an example of a target holder equipped with a position control device.

FIG. 3a illustrates a view in section of a target plate on which the surface referred to as a target 10, intended to be set in rotation using means 70, is mounted. Translation means are also provided; these may be a lateral displacement motor 40.

With the aid of a set of dedicated means, a so-called target holder structure makes it possible to set the surface 10 in movement and position it on a support 20.

The target holder is subjected to a rotational movement (the axis of which is perpendicular to the surface of the target) and a translational movement (parallel to the surface of the target). The rotation is motorized by the means 70, and a ball bearing makes it possible for the target to rotate. The translation is also motorized by a lateral displacement motor 40, using a stepper motor, the body of which is fixed to the mobile part of the translation stage and the screw to the fixed part.

Furthermore, five motors make it possible to modify the depth position of the target and its orientation. The two motors 61 and 62 positioned behind the target allow prealignment of the target with respect to the rotation axis, so that the surface of the target is as perpendicular as possible to the rotation axis. The two motors are powered by using a rotating contact.

The three other motors 51, 52 and 53, which may typically be pico-motors, make it possible to carry out pre-alignment of the translation stage parallel to the surface of the target, and these are the ones which are used during the fine depth and orientation alignments. They are arranged in "line-point-plane" fashion, in order to facilitate the alignments. An angle piece 21 and a bracket 22 are used to compensate for the weight of the target and relieve the load on the motors. Two springs 26 allow precise adjustment of the compensation for the weight of the rotating part of the target holder.

The bracket 22 comprises fixing elements allowing it to be fixed to an intermediate support intended to support the target. It is furthermore secured to a plate 23 actuated by the lateral displacement motor 40. The assembly may be fixed immovably on the target holder.

FIG. 3b shows the mobile surface in plan view and illustrates the translational movement which can be provided by the lateral displacement motor 40.

FIG. 3c illustrates a so-called rear view of the platform equipped with the device and illustrates the set of pico-motors 51, 52 and 53 arranged in "line-point-plane" fashion, so as to be able to correct orientation defects of the surface set in rotation by the means 70.

The various motorized elements are controlled by a controller which transmits the information obtained from the temporal analysis carried out by the software, based on the images collected by the camera 16 illustrated in FIG. 1.

This camera 16 records the interference fringes carried by the interference beam 11/12.

The camera captures the movements of the interference fringes, which are subsequently analyzed by a computer program suited to this task and based on the Fourier transform.

This computer program makes it possible to determine:
- the variation in the spacing of the fringe pattern (number of fringes on the camera);
- the offset of the fringe pattern (absolute position of the fringe pattern with respect to the edge of the camera);
- and the inclination of the fringes (angle of the fringes with respect to the vertical axis y of the camera).

On the basis of this information, the software means for processing this information create an image of the target and determine the depth position of the target, as well as the orientation of the target, that is to say the two vertical and horizontal coordinates of the vector normal to the surface of the target. The software processing means therefore fully characterize the movement of the target in real time.

The instantaneous variation of the depth position and the inclination of the target is then communicated to the three fine alignment motors, so that they compensate for these variations. This feedback loop therefore makes it possible to ensure that the surface always has a depth position and orientation which are identical and controlled.

FIG. 4a illustrates an example of fringes collected by the camera. This analysis is carried out continuously at a rate of about ten image acquisitions and corresponding analyses per second. Each image acquisition leads after processing to an image per se of the analyzed surface being reproduced on the screen. According to a variant, the introduction of colorimetric variations which indicate the orientation and the depth position of said surface may be envisaged.

FIG. 4b illustrates the successive image acquisitions of the surface set in rotation, and shows on the ordinate the position in terms of depth expressed in micrometers as a function of a time abscissa. Typically, during a succession of about 2000 images, position differences of the order of a few micrometers are observed for a surface with a diameter of about fifteen centimeters set in movement.

On the basis of these interference fringe patterns and the change in displacement of the interference fringes as a function of time, it is possible to determine the undesirable movements of the surface in movement and to correct these by using the motors which have been described above and are controlled on the basis of the information derived from the temporal analysis of the interference fringes.

The optical device for controlling the orientation and the position of a surface in movement by interferometric measurement, as described above, is particularly suitable for the generation of a secondary beam produced by irradiating a target under the action of a primary laser beam.

Specifically, in order to use a so-called secondary optical source generated from a primary source, many applications require the interaction surface to be kept with very high precision at the focal point of the primary source and its orientation to be controlled, that is to say for the source point of the secondary emission to be controlled with precision.

When using a target irradiated by a primary source in order to generate a secondary source, it is essential to regenerate said target and therefore provide displacement thereof so as to continuously expose a fresh surface. Means may advantageously be provided for setting said target in rotation. Nevertheless, these means necessarily lead to distortions at the level of said target, which should be corrected in real time, whence the need to provide a device such as that of the invention.

Example of Producing a Secondary Source of the Harmonic Type Comprising the Device for Position Control by Interferometric Measurement.

The secondary source in question is a pulse source of very short duration $F_2$ intended to be able to analyze extremely rapid physical phenomena.

An incident pulsed beam of the femtosecond type $F_1$ at a first wavelength $\lambda_1$, for example produced by a primary optical source, is sent onto a target 10 to which a rotational movement is imparted.

Typically, the target may be a glass disk whose interaction with the primary beam generates the emission of a beam of the harmonic type (that is to say at wavelengths higher than that of the incident primary beam) which can be compressed in order to obtain a beam with a duration of the order of a few tens or hundreds of attoseconds. The beam generated in this way corresponds to the beam $F_2$ represented in FIG. 5.

The target is furthermore mounted on a target holder such as the one represented in FIGS. 3a to 3c.

The impact zone of the continuous-wave control laser beam 11 intended for the control device lies in a region of the target close but different to the impact zone of the primary beam $F_1$, so as not to degrade the image of the analysis beam.

All the components used are integrated in a vacuum chamber 30 intended for the observation of physical phenomena; this circular chamber may typically have a diameter of the order of one meter. It is thus possible to detect position differences of the order of ten nanometers with a target having a diameter of the order of ten centimeters. These differences in position and orientation are processed by the means 17 integrated in the feedback loop and come from the information collected in the camera 16 integrated into the chamber.

The invention claimed is:

1. A device for generating a secondary source from a primary optical source emitting a first beam at a first wavelength focused onto a rotating surface, with which said first beam interacts so as to generate a secondary beam, and including an optical device for controlling an orientation and a position of said rotating surface so as to determine an orientation and a position of an emission point of said secondary source on said surface, said optical device for controlling the orientation and the position of the rotating surface by interferometric measurement comprising:

means for rotating said rotating surface, such that the rotating surface, in motion, continuously exposes a fresh surface to generate the secondary beam from interaction of the first beam with the rotating surface, wherein said interaction leads to destruction of an area of said rotating surface and generation of one of a X-UV, electron or proton beam;

a control laser beam split into two branches, one of which is a fixed reference beam and the other of which is a mobile analysis beam;

means for making said reference and analysis beams interfere so as to generate interference fringes;

a camera to image the interference fringes carrying information about the orientation and position of said surface;

means for analyzing said interference images; and means for generating a feedback loop for controlling the orientation and the position of said rotating surface based on the analysis of said signal carrying information.

2. The device for generating a secondary source from a primary optical source as claimed in claim 1, wherein the means for analyzing said interference images comprise means for temporal analysis of the following parameters:

the variation in the spacing of the fringe pattern, corresponding to the number of interference fringes imaged on the camera;

the offset of the fringe pattern in terms of position of the interference fringe pattern with respect to the edge of the camera; and the inclination of the interference fringes, corresponding to the angle of the fringes with respect to the vertical axis of the camera defined in a plane substantially parallel to that of the rotating surface.

3. The device for generating a secondary source from a primary optical source as claimed in claim 1, wherein the means for generating a feedback loop comprise a set of motorized actuators coupled to said rotating surface and arranged in "line-point-plane" fashion, in a plane substantially parallel to that of the rotating surface in order to adjust the orientation and the position of said surface.

4. The device for generating a secondary source from a primary optical source as claimed in claim 1 further comprising a helium-neon laser that generates the control laser beam and wherein the control laser beam comprises a frequency-stabilized control laser beam.

5. The device for generating a secondary source from a primary optical source as claimed in claim 1, wherein the rotating surface comprises one of a glass, metal or plastic disk.

6. The device for generating a secondary source from a primary optical source as claimed in claim 1, wherein the means for making said reference and analysis beams interfere so as to generate an interference beam comprise two beam splitters and a return mirror.

7. The device for generating a secondary source from a primary optical source as claimed in claim 1, wherein the device is configured to widen the diameter of said laser beam so as to cover the detection surface of the camera.

8. The device for generating a secondary source from a primary optical source as claimed in claim 1, wherein the analysis means comprise image processing means for extracting the information about the variation in position and orientation of said surface with respect to a reference plane.

9. The device for generating a secondary source from a primary optical source as claimed in claim 1, wherein the rotating surface is mounted on a target holder, said target holder being equipped with the means for rotating said surface and means for translation of said surface.

10. The device for generating a secondary source from a primary optical source as claimed in claim 9, wherein the target holder and the rotating surface are mounted in a vacuum chamber.

11. The device for generating a secondary source from a primary optical source as claimed in claim 1, wherein the control laser beam is generated by a continuous-wave laser source having a wavelength less than or equal to the wavelength of the primary optical source, in order to ensure high measurement precision.

12. The device for generating a secondary source from a primary optical source as claimed in claim 1, wherein the primary optical source is a femtosecond pulse laser source.

13. The device for generating a secondary source from a primary optical source as claimed in claim 12, wherein the secondary source is a laser beam, which is a harmonic of the primary source, with a duration of from a few tens to a few hundreds of attoseconds.

14. The device for generating a secondary source from a primary optical source as claimed in claim 1, wherein the first beam impacts the rotating surface along a first circle.

15. The device for generating a secondary source from a primary optical source as claimed in claim 14, wherein once the first circle is completed, the first beam impacts the rotating surface along a second circle concentric to the first circle.

* * * * *